United States Patent
Pon et al.

(10) Patent No.: US 9,377,525 B1
(45) Date of Patent: Jun. 28, 2016

(54) METHODS AND SYSTEMS FOR ASSISTING POSITIONING DETERMINATION OF A MOBILE DEVICE

(71) Applicant: Qualcomm Incorporated, San Diego, CA (US)

(72) Inventors: Rayman Wai Pon, Cupertino, CA (US); Mayur Nitinbhai Shah, Mill Creek, WA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 14/569,110

(22) Filed: Dec. 12, 2014

(51) Int. Cl.
*H04W 24/00* (2009.01)
*G01S 5/06* (2006.01)

(52) U.S. Cl.
CPC .......................... *G01S 5/06* (2013.01)

(58) Field of Classification Search
CPC ........................................................... G01S 5/06
USPC ...................................................... 455/456.1
See application file for complete search history.

(56) References Cited

U.S. PATENT DOCUMENTS

| | | | | |
|---|---|---|---|---|
| 2003/0148774 A1* | 8/2003 | Naghian | ............... | H04W 64/00 455/456.1 |
| 2009/0280775 A1 | 11/2009 | Moeglein et al. | | |
| 2010/0120449 A1 | 5/2010 | Jakorinne et al. | | |
| 2011/0275385 A1 | 11/2011 | Escolar-Piedras et al. | | |
| 2013/0017841 A1 | 1/2013 | Kazmi et al. | | |
| 2013/0203423 A1 | 8/2013 | Alles et al. | | |
| 2013/0297561 A1 | 11/2013 | Mizrotsky et al. | | |
| 2014/0018111 A1 | 1/2014 | Farley et al. | | |
| 2014/0036696 A1* | 2/2014 | Lee | ....................... | H04W 48/18 370/252 |
| 2014/0036768 A1 | 2/2014 | Gao et al. | | |
| 2014/0171097 A1 | 6/2014 | Fischer et al. | | |
| 2014/0280231 A1 | 9/2014 | Paruchuri et al. | | |

OTHER PUBLICATIONS

International Search Report and Written Opinion—PCT/US2015/062316—ISA/EPO—Mar. 3, 2016.

* cited by examiner

*Primary Examiner* — Juan A Torres
(74) *Attorney, Agent, or Firm* — Blakely Sokoloff Taylor & Zafman LLP

(57) ABSTRACT

Disclosed is an apparatus and method for assisting positioning determination of a mobile device. The method may include receiving signal measurements, reported by a plurality of different sources within a service area of a communication network, for signals generated by communication network transceivers that are detectable in the service area of the communication network. The method may also include determining quality of the signals generated by the communication network transceivers for mobile device positioning based on an accumulation of the received signal measurements from the plurality of different sources over a period of time. The method may also include generating a prioritized listing of communication network transceivers based on the determined quality of signals generated by the communication network transceivers, and providing the prioritized listing to a mobile device.

30 Claims, 5 Drawing Sheets

METHODS AND SYSTEMS FOR ASSISTING
POSITIONING DETERMINATION OF A
MOBILE DEVICE

FIELD

The subject matter disclosed herein relates generally to mobile device positioning systems and methods.

BACKGROUND

Mobile positioning technologies enable a mobile device to approximate its real world location. A mobile device that utilizes global navigation satellite system (GNSS) positioning determines timing data in signals received from a plurality of satellites. The timing data is then analyzed by the mobile device to determine a current location, including a latitude, longitude, and altitude of the mobile device. The acquisition, monitoring, and processing of the GNSS signals by the mobile device are both energy and computationally intensive processes. Furthermore, the GNSS positioning technique is limited in that it requires a line of sight with at least three satellites to enable position determination. Thus, use of GNSS positioning in cityscapes, indoors, or other visually obscured locations becomes difficult.

A network based positioning system is observed time difference of arrival (OTDOA) positioning. In such a system, the mobile device obtains timing data from cellular network transceiver signals. The timing data is transmitted to a server, which is able to determine the mobile device's position from a combination of the timing data and known real-world locations of the cellular network transceivers. The server may then return the positioning determination to the mobile device. However, typically the server forwards the determined position of the mobile device to a third party, such as an emergency services provider, and possibly the mobile device. This network based positioning technique is also limited because it requires the mobile device to search for, and acquire, the appropriate signals from a group of cellular network transceivers and transmit the data to the server. Furthermore, to determine a second position of the mobile device, the entire process must be repeated. Thus, the searching of cellular network transceivers, the timing required to perform the search, and the number of times network device positioning is performed greatly impact the resulting positioning process, the computational resources consumed by the mobile device, and the power expended by the mobile device to perform the positioning process.

DETAILED DESCRIPTION

Methods and apparatus for providing assistance for positioning determination of a mobile device are described. In one embodiment, the mobile device is a mobile telephone, smartphone, etc. However, other stationary and mobile devices, such as tablet computers, smartwatches, computer systems, as well as other devices, may utilize the positioning techniques discussed herein. For ease of discussion, the remaining description will be directed to a mobile device capable of receiving and processing signals from communication networks, such as cellular telephone networks, wireless fidelity networks, as well as other communication networks.

Figure 1:
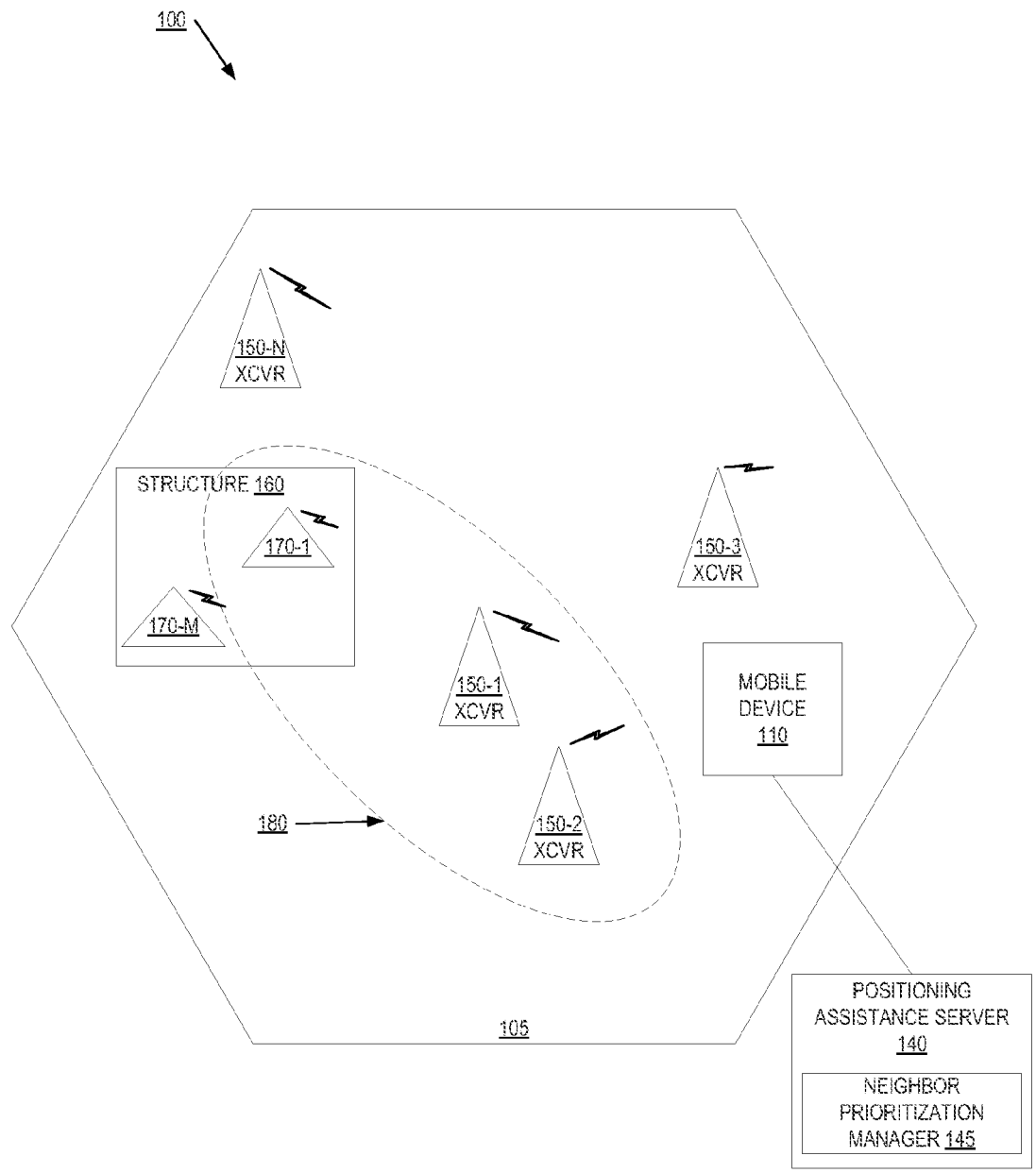
FIG. 1 is a block diagram of an exemplary system architecture for providing assistance during a positioning process performed by a mobile device.

FIG. 1 is a block diagram of an exemplary system architecture 100 for providing assistance during a positioning process performed by a mobile device.

In one embodiment, the system 100 includes a mobile device 110. In one embodiment, mobile device 110 is a mobile computing device, such as a mobile telephone, personal digital assistant, tablet computer, wearable device, etc. capable of communicating over one or more communication networks, such as mobile communication networks, wireless local area networks (such as WiFi), as well as other types of communication networks.

In one embodiment, system 100 also includes a service area 105 of a mobile communication network, which includes a plurality of mobile communication transceivers ("transceivers") 150-1 through 150-N. Each transceiver is a device that receives and sends signals within the service area to enable mobile device 110 to communicate over the mobile communication network for making wireless telephone calls, accessing a computing network, such as the Internet, sending and receiving text messages, etc. The mobile communication network may provide services to mobile device 110, and mobile device 110 may communicate over the mobile communication network, using mobile communication protocols, such as 3G mobile communication protocols, 4G mobile communication protocols, as well as other standard, proprietary, existing, and future mobile communication protocols.

In one embodiment, system 100 further includes structure 160 located within the mobile communication network service area 105. In one embodiment, a wireless local area network (not shown) is deployed within the structure 160. The wireless local area network may be deployed using a plurality of wireless local area network transceivers (also referred to herein as "transceivers") 170-1 through 170-M. The wireless local area transceivers enable mobile device 110 to connect to the corresponding wireless local area network and exchange data over that network. In one embodiment, mobile device 110 communicates with the wireless local area network deployed within structure 160 using standard or proprietary wireless network communication protocols.

In one embodiment, the system 100 also includes a positioning assistance server 140 that is communicatively coupled with the mobile device 110. In one embodiment, mobile device 110 and the positioning assistance server 140 are communicatively coupled via one or more of the mobile communication network, which is accessed by mobile device 110 while in a mobile communication network (e.g., when mobile device 110 is located within a service area, such as service area 105). In another embodiment, mobile device 110 and the positioning assistance server 140 may be communicatively coupled via a wireless local area network, such as the network established by transceivers 170-1 through 170-M within structure 160.

In one embodiment, mobile device 110 may perform one or more positioning processes, such as a mobile-based positioning process, a network based positioning process, a hybrid positioning process, as well as other positioning processes, to determine a real time location of the mobile device 110. For example, mobile device 110 may capture GNSS signals utilizing a GNSS receiver, such as a global positioning system (GPS) receiver, analyze the GNSS signals, and determine a real-time location of the mobile device 110. The GNSS signals, however, require line of sight with at least three GNSS satellites. Thus, when mobile device 110 is located within a cityscape, a physical structure, etc., GNSS based positioning may not be possible. In one embodiment, mobile device 110 may therefore perform other types of mobile based positioning processes for determining its location.

In one embodiment, mobile device 110 performs one or more mobile-based positioning processes using signals generated by transceivers 150-1 through 150-N, as well as using signals generated by transceivers 170-1 through 170-M. For example, mobile communication network transceivers generate signals, such as positioning reference signals (PRS), cell-specific reference signals (CRS), etc., for emergency service purposes. These signals, when combined with known locations of the transceivers that generated those signals, may be analyzed using techniques, such as observed time difference of arrival (OTDOA) or time of arrival (TOA) techniques, to trilaterate the mobile device's 110 position from those signals and timing data available within those signals. The signals can be periodically captured and analyzed by the mobile device so that mobile device can determine its real-world location in real time.

In one embodiment, mobile device 110 obtains appropriate signals generated from transceivers 150-1 through 150-N and/or transceivers 170-1 through 170-M, and performs real-time positioning processes using those signals to determine the mobile device's 110 real world location. Such a process can be time intensive, resource intensive, and power intensive when the mobile device is required to search for transceiver signals, select a subset of signals, and then analyze those signals. Therefore, in one embodiment, mobile device 110 first queries positioning assistance server 140 for a listing of neighbor transceivers within the service area 105 of a mobile communication network in which mobile device 110 is currently located.

In one embodiment, prior to receipt of the request from the mobile device 110 for a listing of service area transceivers, however, positioning assistance server 140 generates a prioritized and ordered listing of a subset of transceivers within the service area 105. In one embodiment, the listing of transceivers is generated for enabling the determination of a mobile device's position using the listing, as will be discussed in greater detail below. In one embodiment, the subset may include less than all of the transceivers 150-1 through 150-N and 170-1 through 170-M which are also located within the service area 105. In another embodiment, the subset may include less than all of the transceivers 150-1 through 150-N, and none of the transceivers 170-1 through 170-M. In yet another embodiment, the subset may include less than all of the of the transceivers 170-1 through 170-M, and none of the transceivers 150-1 through 150-N. Furthermore, the listing of transceivers within the service area 105 is a prioritized listing of transceivers where the priority order is based on the quality of the signals generated by those transceiver. The list therefore provides an order in which the mobile device can search for transceivers and signals generated by those transceivers. As a result, when mobile device 110 requests and receives the prioritized and ordered listing of transceivers, such as subset 180, mobile device performs a focused and limited search for signals generated by the transceivers enumerated in the listing. As will be discussed in greater detail below, the selection, ranking, and prioritization of transceivers within the listing is based on periodic real-world signal measurements collected by numerous devices within the service area 105, in order to reflect the current and evolving real world signal conditions within the service area 105.

In one embodiment, a plurality of devices with the service area 105, such as mobile devices, transceivers, and other sources within the service area 105 that are capable of obtaining and measuring signals generated by transceivers 150-1 through 150-N and 170-1 through 170-M, periodically capture signals, which are relevant for mobile-based device positioning (e.g., PRS, CRS, WiFi signals, CDMA measurements such as 1× pilots, GSM signals, WCDMA signals, Bluetooth beacon, smart lighting, etc. signals, as well as other wireless signals that can be received, measured, and used by a mobile device as discussed herein). For example, different types of mobile devices, such as smartphones, Internet is Everywhere (IoE) enabled devices, smart devices, augmented glasses, etc. are utilized for measuring the signals generated by transceivers within the service area 105. Furthermore, different types of transceivers, such as wireless local area network transceiver, wide area network transceivers, cell station transceiver, base state transceiver, etc. are also utilized for measuring the signals generated by transceivers within the service area 105. Measurements from the various sources are then taken from the captured signals to determine metrics indicative of a quality of the signals generated by their corresponding transceivers. For example, the measurements may be indicative of signal power or strength, a signal to noise ratio, availability indicating whether a signal can even be received and detected or not, reliability as to how often signals are available, a stability associated with synchronization and timing of signals, etc. Furthermore, the signals may be generated by synchronous or asynchronous systems. In the embodiments, the measurements are indicative of an overall quality of the signals generated by their corresponding transceivers, with respect to enabling mobile based positioning by mobile devices.

The measurements are then communicated by the sources (e.g., mobile devices, transceivers, and other sources) to positioning assistance service 140. Neighbor prioritization manager 145 is a process running within server 140 that analyzes the signal measurements, and correlates high quality signals with the transceivers that are responsible for generating the high quality signals. In one embodiment, neighbor prioritization manager 145 may combine the plurality of measurement metrics received from the sources to generate a quality score, or other measure, indicative of the quality, availability, stability, and detectability of the signals that are generated by the transceivers in service area 105. In one embodiment, although not illustrated, communication network transceiver signals generated by transceivers outside of service area 105, which may be detectable and measurable by sources within service area 105, may also be included in the prioritization and listing processes discussed herein. When a score exceeds a threshold value, the corresponding transceiver may be selected by neighbor prioritization manager 145 for inclusion within the subset whether or not the transceiver is located within the service area. Furthermore, the score may also be used to rank the transceivers within the selected subset. In one embodiment, the selection and ranking is based on the periodic and ongoing measurements reported from the sources within service area 105. As a result, the number of transceivers that exceed the quality threshold for a service area may fluctuate over time. Furthermore, the number of transceivers for different service areas that exceed the threshold may be different. In one embodiment, the threshold is itself dynamic so that a maximum number of transceivers are selected for inclusion in the listing, with the transceivers that receive the highest quality signal scores being selected for the listing. In each of the scenarios above, the subset and ranking is responsive to real world conditions of the service area 105 as reported by the devices actually residing in service area 105.

For example, when a building is erected within service area 105, previously high quality signals generated by one or more transceivers, may become low quality signals. As another example, a tree may be removed which is very close to a transceiver, thereby improving a quality of the previously poor quality signals generated by that transceiver. As yet another example, a transceiver may be experiencing a hardware and/or software malfunction, which temporarily alters the quality of the signals generated by the transceiver. As yet another example, transceivers that are located near a sports stadium may be periodically turned off, thereby rendering their corresponding signals as unreliable. The above examples are not intended to be exhaustive, but rather illustrative of the varied real-world circumstances that may impact signal quality within a service area, such as service area 105. These circumstances may arise and/or go away, and thus may be captured by the periodic reporting of the plurality of different sources. The ranked and ordered listing is responsive to the ongoing real-world conditions associated with a service area, as reported by the devices within the service area 105.

Dashed oval 180 illustrates an example subset of transceivers, including transceivers 150-1, 150-2, and 170-1, which generate signals detectable within service area 105. The subset 180 is illustrative only, as any combination of transceivers inside or outside of the service area 105 could be selected based on the reported quality of their signals within the service area 105. Furthermore, in one embodiment, mobile device 110 may limit its search to the transceivers within the listing, and in the order enumerated in the listing, in order to save system and power resources at the mobile device 110 when searching for signals to use for performing a positioning process. That is, mobile device 110 need not perform a generalized search of available signals and transceivers, which may include transceivers generating low quality signals thereby rendering the mobile-based positioning unreliable, harder to computer, etc. Instead, mobile device 110 may search only those transceivers that are reported to be generating high quality signals as enumerated in the prioritized listing discussed herein. For example, based on an enumerated listing of service area transceivers, mobile device may search for and use signals generated by transceiver 170-1. Although transceiver 150-3 is closer to mobile device, the real world signaling conditions as reported by the devices in service may indicate that the quality of transceiver's 150-3 signals are low, and should not be searched or used by the mobile device when performing mobile based positioning. However, in another embodiment, mobile device 110 may search for, receive, measure, and use signals from other sources, such as sources within neighbor lists generated from a transmitting cell towers (not shown), wireless local area network access points (not shown), as well as other sources. In this embodiment, mobile device 110 may prioritize its own searches by favoring the prioritized listing over the other listings, by giving more search resources to the prioritized listing, etc.

In one embodiment, mobile device 110 requests the prioritized and ordered subset of transceivers from positioning assistance server 140 when mobile device initiates one or more of the positioning processes discussed herein. Mobile device 110 may then limit its search to the signals generated by the transceiver enumerated in the listing, even though additional signals/transceivers may be available. However, as discussed herein, other sources may provide listings of communication network transceivers that mobile device 110 may be able to use for performing mobile-based positioning. Mobile device 110 may search the other listings after a search of the prioritized listing (if needed), may search as a lower priority listing, may rank the transceivers in the other listings lower than those enumerated in the received prioritized and ordered listing, or may dedicate less resources to searching the other listings than the resources allocated to search the received prioritized listing. By using the ordered and limited search techniques, mobile device 110 is able to perform a faster and more successful search and acquisition of high quality signals for use in mobile positioning. Once a minimum number of signals are obtained for mobile based positioning, mobile device is able to perform a mobile based positioning process discussed above. In another embodiment, mobile device 110 may transfer the obtained signals to a positioning server (not shown) to enable the positioning server to perform a network based positioning process, such as an OTDOA type process. In yet another embodiment, mobile device may perform both mobile-based positioning and network-based positioning utilizing the obtained signals. Furthermore, mobile device 110 may additionally report its own success and/or failure in obtaining signals from the enumerated transceivers during the positioning process, as well as measurements of any received signals. Thus, mobile device 110 may also be a reporting source to positioning assistance server 140.

In one embodiment, different types of transceivers (e.g., transceiver 170-1 and transceiver 150-1) may be included in the listing to enable mobile device to perform positioning based on their combined signals. By including the different signal transceiver types, mobile device 110 may transition between different networks and associated mobile-based positioning techniques, such as transitioning between indoor positioning using a ranked and ordered listing of wireless local area network transceivers to/from outdoor positioning using a ranked and ordered listing of mobile communication network transceivers. In one embodiment, a combined listing, as well as separate ranked and ordered lists, may be generated and maintained by positioning assistance server 140. In one embodiment, when mobile device 110 requests the listing, mobile device 110 may include device information, such as a hardware resources, processing capabilities and/or limitations, a physical orientation of the mobile device 110, as well as other characteristics of the mobile device 110. In one embodiment, the characteristics of mobile device 110 may then be utilized by positioning assistance server 140 to select between listings based on one or more of the mobile device's 110 characteristics. In another embodiment, positioning assistance server 140 may refine an existing listing, or generate a new listing, based on one or more of the mobile device's 110 characteristics, as well as changes in those characteristics. For example, a first ranked and ordered listing of mobile communication network transceivers may be provided to mobile device 110 when the device information indicates a first orientation, and a second ranked and ordered listing of mobile communication network transceivers may be provided to mobile device 110 when there is a change in orientation (e.g., when the device movies from a western-facing orientation to an eastern-facing orientation). The separate and/or combined listings, which in embodiments may be selected or generated based on characteristics of the mobile device 110, can thereafter be provided to mobile device 110 for performing communication network transceiver search and subsequent mobile-based positioning, as discussed herein.

Figure 2:
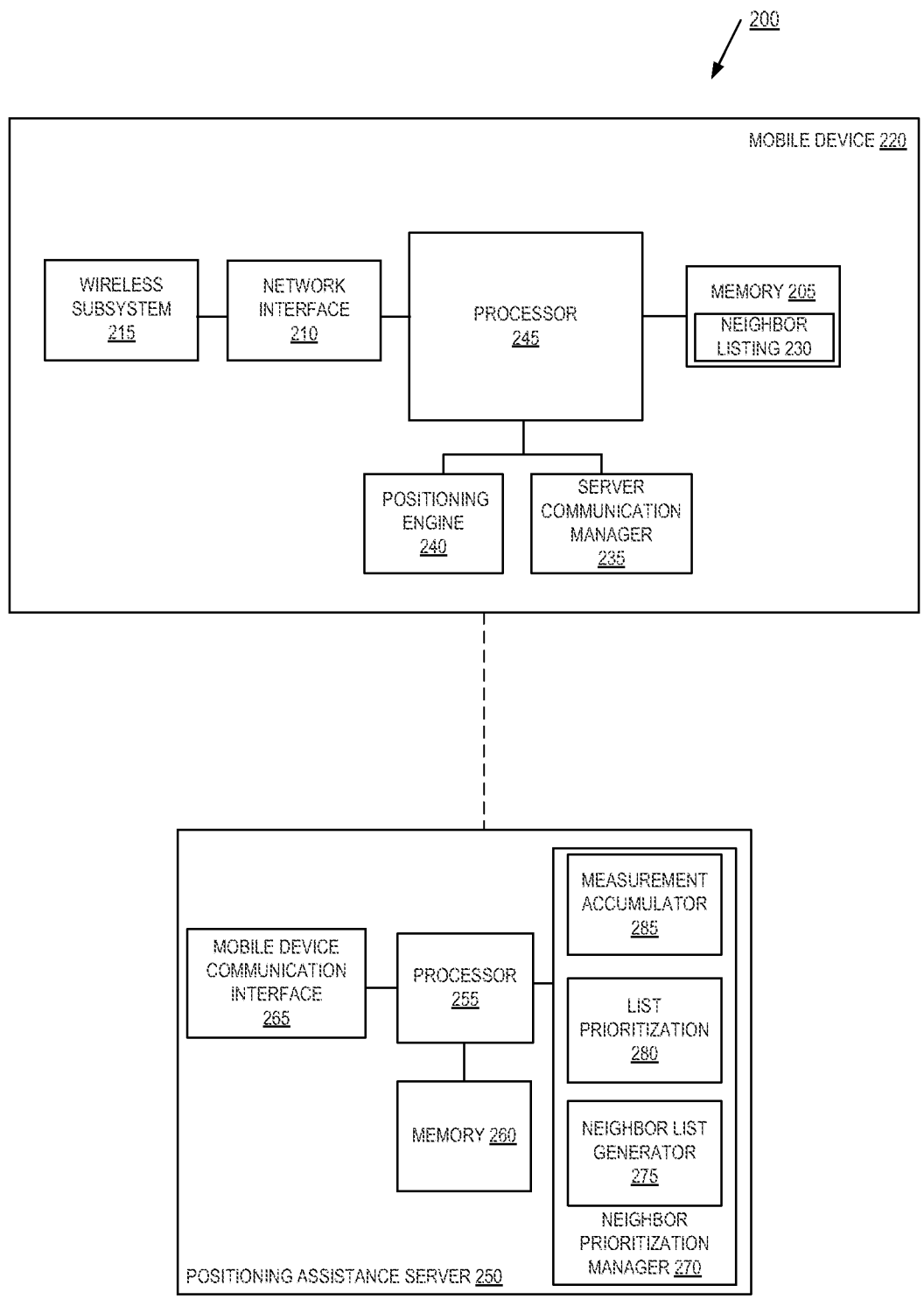
FIG. 2 is block diagram of one embodiment of a mobile device and a positioning assistance server.

FIG. 2 is block diagram of one embodiment 200 of a mobile device 220 and a positioning assistance server 250. In one embodiment, the mobile device 220 and positioning assistance server 250 provide additional details for the mobile device and positioning assistance server discussed above in FIG. 1.

In one embodiment, mobile device 220 is a system such as a mobile telephone, tablet computer, wearable device, etc., which may include one or more processors 245, a memory 205, positioning engine 240, server communication manager 235, and network interface 210. Mobile device 220 may also include a number of processing modules, which may be implemented as hardware, software, firmware, or a combination, such as the positioning engine 240 and/or server communication manager 235. It should be appreciated that mobile device 220 may also include, although not illustrated, a user interface (e.g., keyboard, touch-screen, or similar devices), a power device (e.g., a battery), as well as other components typically associated with electronic devices. Network interface 210 may also be coupled to a number of wireless subsystems 215 (e.g., Bluetooth, WLAN, WiFi, Cellular, or other networks) to transmit and receive data streams through a wireless link. In one embodiment, wireless subsystem 215 communicatively couples mobile device 220 to positioning assistance server 250.

In one embodiment, positioning assistance server 250 is also a system, which may include one or more processors 255, a memory 260, and wireless subsystem, such as mobile device communication interface 265. Positioning assistance server 250 may also include a number of processing modules, which may be implemented as hardware, software, firmware, or a combination, such as neighbor prioritization manager 270. It should be appreciated that positioning assistance server 250 may also include, although not illustrated, a user interface (e.g., keyboard, touch-screen, or similar devices), a power device (e.g., a battery), a display screen (e.g., an LCD display), as well as other components typically associated with server computer system. Mobile device communication interface 265 (e.g., a Bluetooth, WiFi, WLAN, Cellular, or other wireless subsystem) enables server 250 to transmit and receive data through a wireless link to/from mobile device 220.

In one embodiment, one or both of memory 205 and memory 260 may be coupled to processors to store instructions for execution by the processors, such as processor 245 and processor 255. In some embodiments, memory 205 is non-transitory. Memory 205 may store one or more modules (i.e., positioning engine 240 and/or server communication manager 235), and memory 260 may also store one or more modules (i.e., measurement accumulator 285, list prioritization 280, and neighbor list generator 275 of neighbor prioritization manager 270), to implement embodiments described herein. It should be appreciated that the embodiments as will be hereinafter described may be implemented through the execution of instructions, for example as stored in memory or other element, by processor 245 of mobile device 220, and/or other circuitry of mobile device 220, by processor 255 of positioning assistance server 250, and/or other devices. Particularly, circuitry of mobile device 220 and positioning assistance server 250, including but not limited to processor 245 and processor 255, may operate under the control of a program, routine, or the execution of instructions to execute methods or processes in accordance with the aspects and features described herein. For example, such a program may be implemented in firmware or software (e.g. stored in memory 205 and/or memory 260) and may be implemented by processors, such as processor 245 and/or processor 255, and/or other circuitry. Further, it should be appreciated that the terms processor, microprocessor, circuitry, controller, etc., may refer to any type of logic or circuitry capable of executing logic, commands, instructions, software, firmware, functionality and the like.

In one embodiment, positioning assistance server 250 is responsible for providing a prioritized and ordered listing of communication network transceivers, which generate signals relevant to mobile-based positioning, for a service area in which a requesting mobile device is located. However, prior to receiving the request, positioning assistance server 250 receives via interface 265 signal measurement reports from a plurality of sources within a service area.

Measurement accumulator 285 is responsible for gathering the reports and associating newly received signal measurement data for a transceiver with previously received signal measurement data for the transceiver. The new and/or accumulated signal measurement data for a plurality of transceivers for a service area is stored in memory 260. Furthermore, as discussed above, the measurement data is periodically reported from a plurality of different gathering sources within a service area. Therefore, measurement accumulator 285 may also be responsible for maintaining a limited history of measurement reports for transceivers in a service area. In one embodiment, only newly received signal measurement data is considered for a transceiver. In another embodiment, a time period of signal measurement data is maintained by measurement accumulator. In either embodiment, the signal measurement data maintained by measurement accumulator 285 reflects the ongoing and evolving real-world signal conditions for transceivers in a service area of a communication network. In one embodiment, measurement accumulator 285 also gathers sensor data associated with the signal measurement data and/or transceivers generating the signals, such as orientation data, magnetometer data, accelerometer data, device type, etc., which may be useful in determining and refining quality of a received signal.

List prioritization 280 is responsible for analyzing the accumulated signal measurement data. In one embodiment, list prioritization 280 analyzes one or more quality metrics in the signal measurement data in order to score the transceivers within a service area. As discussed herein, metrics such as signal strength indicative of a magnitude of the signal at a receiving device, signal power level indicative of a level of power that a transmitter produces at output of the signal, signal to noise ratios indicative of a level of the signal compared to a level of background noise, signal timing quality indicative of a level of accuracy of a source providing timing information for the signal, signal synchronization quality indicative of an ability to coordinate communication with a signal source, signal reliability indicative of how likely a signal will be available from a given source, signal availability indicative of whether or not a signal is available, signal stability indicative of an amount of variable in a signal's quality, signal bandwidth indicative of the upper and lower limits of a signal's frequency, signal frequency, etc. may be analyzed by list prioritization. In one embodiment, list prioritization 280 further analyzes the sensor data associated with the signals and/or transceivers to determine whether signal quality is influenced by one or more characteristics of the device generating the signal (i.e., poor signal quality metrics may be due to a particular physical orientation of a transmitting antenna, a build quality of the antenna, etc.), is due to the signal itself, or a combination. In one embodiment, the analysis of the signal quality metrics and/or sensor data is utilized by list prioritization 280 to generate a score indicative of the quality of the signals, which are relevant to mobile-based positioning, generated by the transceivers in a service area. The score may be a weighted sum of the various signal quality metrics. The score may also be based on a single signal metric, which is deemed to be particularly relevant to signal quality. Other scoring techniques that assist in the determination of high quality network transceiver signals may be utilized consistent with the discussion herein.

After the analysis of the signal measurement data, neighbor list generator 275 is responsible for selecting and ranking transceivers for inclusion in a prioritized and ranked subset of transceivers for a service area. In one embodiment, neighbor list generator 275 may use the score(s) generated by list prioritization 280 to select transceivers that exceed a minimum score value and/or threshold. The selected transceivers may then be enumerated in a priority order, which may also be based on the scores associated with the selected transceivers, in the subset of transceivers.

In one embodiment, neighbor prioritization manager 270 of positioning assistance server 250 performs the measurement accumulation, list prioritization, and neighbor listing generation on a periodic basis. That is, as new signal measurements are received, neighbor prioritization manager 270 updates and/or replaces the selections within the enumerated listing of communication network transceivers. Furthermore, the updating may include adding new transceivers to the listing and removing transceivers from the listing. The listing is therefore dynamic over time as new signal measurements are received, and reflects the evolving real world conditions within a service area for which the listing is generated.

When positioning engine 240 of mobile device 220 initiates a positioning process, such as a mobile or network based positioning process (e.g., an OTDOA equivalent positioning process that will utilize PRS or CRS signals generated by communication network transceivers, a wireless local area network based indoor positioning process, etc.), positioning engine 240 informs server communication manager 235 to request a prioritized and ranked listing of transceivers. In one embodiment, the request may include a last-known location or estimated location of the mobile device 220. In one embodiment, the last-known location or estimated location may be a GNSS based position estimate, an estimated position based on signals visible to the mobile device 220, a position estimate based on data indicative of the service area of a service cell in which the mobile device is located, as well as other estimates. The request also includes data indicative of the service area, sub region of the service area, physical structure, etc. in which the mobile device is currently located. Furthermore, if a wireless network is not available at a time when mobile device 220 attempts to issue a request for a prioritized listing, the mobile device 220 may store the data associated with the request in memory 205 for issuance at a later time when access to the positioning assistance server 250 does become available, either wirelessly or via cable wire such as USB.

The request with the service area, including the last-known location or estimated location when available, is sent from the mobile device 220 to the positioning assistance server 250. In one embodiment, the positioning assistance server 250 responds with the prioritized and ordered listing of transceivers associated with the service area indicated in the request. However, in one embodiment where the request also includes a sub region of the service area, physical structure, last-known GNSS position, position estimate, etc., the neighbor list generator 275 may utilize the additional request data to further refine a prioritized and ordered listing of transceivers based on the additional request data. For example, when the request indicates that mobile device 220 is within a specific quadrant of a service area, neighbor list generator 275 may rearrange the priority order of transceivers in the enumerated listing, may change which transceivers are selected for the listing, or otherwise customize the selected and prioritized subset of transceivers. The resulting prioritized and ranked subset of transceivers in the service area is then returned to the mobile device 220.

Server communication manager 235 stores the received enumerated listing as a neighbor listing 230 in the memory. Positioning engine 240 may then access the listing 230 in memory 205 to perform one or more positioning processes, as discussed herein. In one embodiment, when positioning engine 240 performs a positioning process, positioning engine 240 searches for signals generated by the communication network transceivers enumerated in the listing 230, even if signals generated by other transceivers are available. Furthermore, positioning engine 240 searches for the signals in the priority order specified in the listing, so that the transceivers which are ranked as having the highest signal quality are searched first. As a result, positioning engine 240 performs an efficient search to locate available signals and associated transceivers for performing the positioning process. Furthermore, mobile device 220 may report its own signal acquisition success, failure, measurements, etc. for the transceivers that it used in the positioning process, which can be utilized by server 250 as another form of accumulated report as discussed above.

In one embodiment, positioning engine 240 performs mobile based positioning using the listing 230. In another embodiment, positioning engine 240 utilizes the listing 230 to obtain signals for network based positioning. In either embodiment, mobile device 220 may retain the listing for future use when in the mobile communication network service area. Furthermore, additional listings may be stored in memory 205 for other service areas, different specific regions within a service area, etc. in which mobile device 220 performs positioning. In one embodiment, memory 205 may store different listings for different types of positioning processes. For example, in response to a request for a prioritized listing, mobile device 220 may receive and store multiple prioritized listings relevant to the type of positing process to be performed by the mobile device and/or a current position of the mobile device, as well as other regions, sub regions, likely courses of travel, etc. In one embodiment, the mobile device 220 periodically requests updated listings even when a positioning process has not been initiated. In another embodiment, an updated listing is requested each time mobile device 220 performs a new positioning process in a service area.

In one embodiment, mobile device 220 may optionally have its own neighbor prioritization manager, similar to neighbor prioritization manager 270. In this embodiment, the mobile device 220 could track its own signal measurements, signal acquisition success, signal reliability statistics, etc. and create its own prioritized and ranked listing of communication network transceivers within a service area. The mobile generated listing may be maintained by mobile device 220 as a separate listing from that generated by server 250, in combination with received rankings and/or selections of the positioning assistance server 250, or in lieu of requesting the listing from server 250.

In one embodiment, positioning engine 240 may also use the listing 230 to obtain signals, and report the results to a network based positioning server (not shown) to enable the network based positioning server to determine mobile device's 220 position. In this embodiment, mobile device 220 utilizes the prioritized and ordered list to efficiently search for communication network transceiver signals, as discussed herein. The network based positioning server could then utilize the signal measurements reported by the mobile device 220 to perform a network based positioning process, such as OTDOA. In embodiments, a single positioning process is performed either by the mobile device 220 or by the network based positioning server. However, the network based positioning process may also be performed in conjunction with the mobile based positioning process, as discussed herein.

Figure 3:
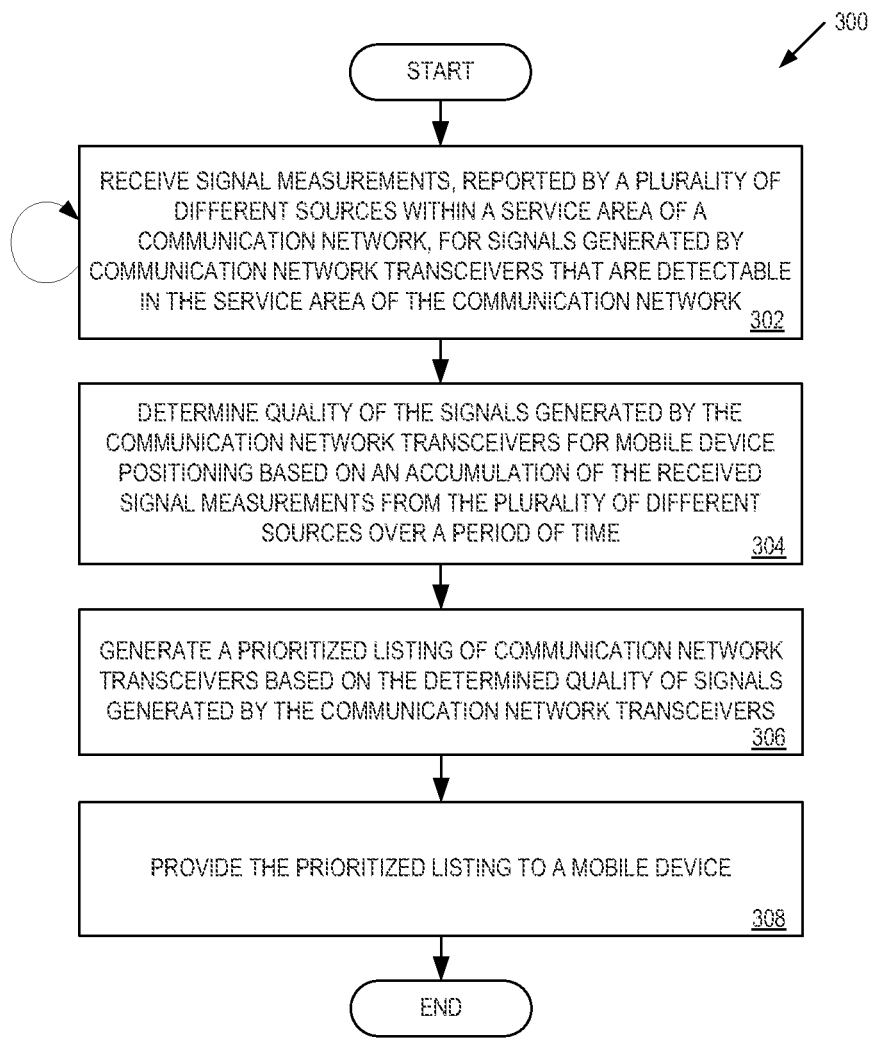
FIG. 3 is a flow diagram of one embodiment of a method for a positioning assistance server managing a prioritized listing of communication network transceivers for use by a mobile device when performing a positioning process.

FIG. 3 is a flow diagram of one embodiment of a method 300 for a positioning assistance server managing a prioritized listing of communication network transceivers for use by a mobile device when performing a positioning process. The method 300 is performed by processing logic that may comprise hardware (circuitry, dedicated logic, etc.), software (such as is run on a general purpose computer system or a dedicated machine), firmware, or a combination. In one embodiment, the method 300 is performed by a positioning assistance server (e.g., positioning assistance server 140 or 250). Furthermore, in one embodiment, the method may be performed by a mobile device (e.g., mobile device 110 or 220) that performs its own transceiver selection and prioritization as discussed above.

Referring to FIG. 3, processing logic begins by receiving signal measurements, reported by a plurality of different sources within a service area of a communication network, for signals generated by communication network transceivers that are detectable in the service area of the communication network (processing block 302). As discussed herein, the different sources include devices located within a service area that are capable of receiving and providing measurement data for detectable signals. For example, mobile devices, communication network transceivers, and other devices may be the different sources. In one embodiment, the signal measurement reports are periodically received so that the signal measurements reflect current and ongoing signal conditions within the service area in which the signals are generated.

Processing logic determines quality of the signals generated by the communication network transceivers for mobile device positioning based on an accumulation of the received signal measurements from the plurality of different sources over a period of time (processing block 304). The accumulation may include the accumulation of reported signal measurements, which are collected by a plurality of different sources and different locations within the service area, for the same signal transceiver. Furthermore, the accumulation can occur over a period of time. Thus, the signal measurement data, from which quality is determined, reflects an overall picture of the signals generated by a particular transceiver as would be experienced by the plurality of different sources. Furthermore, the accumulated signal measurements are analyzed to determine signal strength, signal availability, signal reliability, etc. from the plurality of reports. In one embodiment, sensor data associated with the signals or the source that generated the signals may also be analyzed when determining signal quality. The result is a quality measurement/score generated from a crowd of local signal receivers within a service area, which reflects the current and real-world signaling conditions in the service area.

From the determined quality of the signals of the communication network transceivers that generate signals detectable within the service area, processing logic generates a prioritized listing of communication network transceivers based on the determined quality of signals generated by the communication network transceivers (processing block 306). In one embodiment, the quality associated with the signals generated by the transceivers is utilized by processing logic to select certain transceivers for inclusion within the subset. For example, if a signal quality score associated with a transceiver exceeds a quality threshold value, the transceiver is selected for inclusion within the subset. Furthermore, the signal quality score could be utilized to rank the communication network transceivers relative to one another within the subset. The result is a limited and enumerated listing of communication network transceivers that are associated with high quality signals, for mobile device positioning purposes, which reflect real world measurements reported from devices within a service area or a sub-region of a service area.

In one embodiment, by obtaining communication network transceiver signal measurements from a number of sources within a service area, processing logic can build a prioritized listing of neighboring network transceivers within a region (e.g., the entire service area or a sub-region with a service area) to be used when performing a positioning process for a mobile device. The prioritized listing generated by processing logic ranks network transceivers based on factors associated with a quality of signals, such as signal availability, signal reliability, signal strength, etc. as reported from the plurality of sources within the service area. That is, the signal quality metrics are crowd sourced to enable processing logic to generate an ordered and ranked listing of communication network transceivers that are likely to have detectable signals that are of a high quality within a region of a service area. In one embodiment, processing logic periodically gathers, measures, and assesses communication network transceiver signal availability and quality, as reported from communication network transceivers, mobile devices, and other signal receivers, to maintain and update the accuracy of the prioritized listing. For example, a building may be constructed within a service area that renders the previously high quality and high availability signals of a communication network transceiver practically useless for mobile based navigation purposes. As another example, a tree within a service area may be removed, which increases the quality and/or availability of signals of certain communication network transceivers. As yet another example, a communication network transceiver that was previously associated with high signal quality and availability may experience a software and/or a hardware malfunction, that significantly deteriorates the quality and/or reliability of that communication network transceiver's signals. Therefore, the prioritized listing adapts to the evolving real world conditions of a service area of a communication network, or sub-region within the service area, over time and as signal quality reports are accumulated and aggregated by the prioritization manager.

Processing logic then provides the prioritized listing to a mobile device (processing block 308). In one embodiment, the prioritized listing is provided to the mobile device in response a request indicating that the mobile device has initiated a positioning process, and may specify the service area in which the mobile device is located to enable processing logic to respond with a service-area-wide prioritized and ranked listing of transceivers. In another embodiment, the request received from the mobile device may include a last known position, a sub-region of a service area, etc. of the mobile device and/or device information, such as device orientation, processing resources, etc. Processing logic, in one embodiment, utilizes this additional information to refine the enumerated prioritized listing of communication network transceivers. In this embodiment, processing logic would return to processing block 306 to refine the listing based on the additional information associated with the mobile device's position. In another embodiment, processing logic can select a listing from among a set of listings generated for a service area or sub-region of the service area based on the device information and/or location. Thus, the listing provided by processing logic at block 308 could be customized or selected based on the mobile device's current location, the mobile device's current orientation, one or more hardware and/or software limitation of the mobile device, etc. For example, the request could indicate that the mobile device is within a structure, in which case the listing could include wireless local area network transceivers within the structure. As another example, the request could indicate that the mobile device is in a specific geographic region of a service area, which is associated with different quality transceivers as other geographic regions of the service area. In yet another embodiment, the request could indicate that the mobile device has a northern-facing orientation. In these embodiments, processing logic may respond to a request of a mobile device for a prioritized listing, and request for an updated listing, an augmented listing, etc. even when mobile-based positioning has not been initiated, as discussed above.

Figure 4:
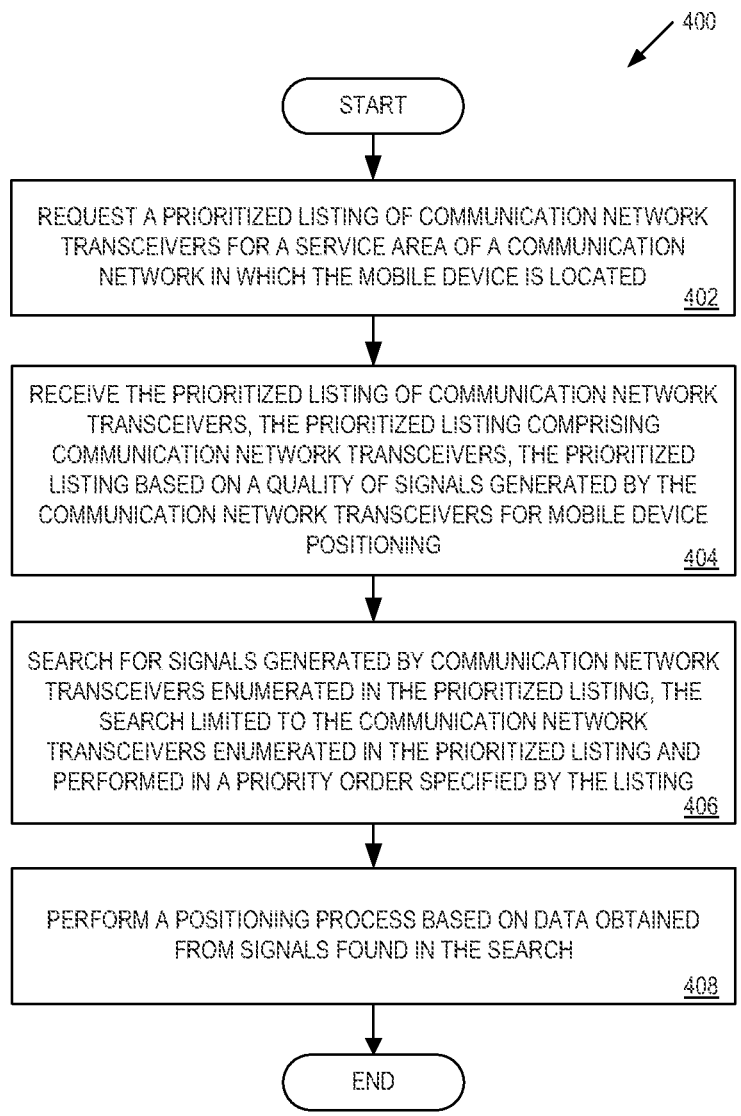
FIG. 4 is a flow diagram of one embodiment of a method for a mobile device performing a positioning process using a received prioritized listing of communication network transceivers.

FIG. 4 is a flow diagram of one embodiment of a method 400 for a mobile device performing a positioning process using a received prioritized listing of communication network transceivers. The method 400 is performed by processing logic that may comprise hardware (circuitry, dedicated logic, etc.), software (such as is run on a general purpose computer system or a dedicated machine), firmware, or a combination. In one embodiment, the method 400 is performed by a mobile device (e.g., mobile device 110 or 220).

Referring to FIG. 4, processing logic begins by requesting a prioritized listing of communication network transceivers for a service area of a communication network in which the mobile device is located (processing block 402). In one embodiment, additional location information can be included in the request, such as a last-known location of the mobile device, an indication of a detected transceiver, device information indicative of one or more characteristics of the mobile device, etc. As discussed above, the additional location information enables the prioritized listing to be further refined for the requesting mobile device. Furthermore, as discussed above, in one embodiment, a prioritized listing may already be resident in a memory of the mobile device. That is, in embodiments, mobile may request a prioritized listing of communication network transceivers without initiation of a positioning process. For example, mobile device may request a prioritized listing for an area in which the device is located before a positioning process is initiated, may request an update to an existing listing, may request a listing when resources are available to process the request, may request a listing upon entering a new service area, as well as at other times. In these embodiments, after the initiation of the positioning process at processing block 402, processing logic of the mobile device may draw on a prioritized listing that is already present with a memory of the mobile device.

Processing logic receives the prioritized listing of communication network transceivers, where the prioritized listing is based on a quality of signals generated by the communication network transceivers for mobile device positioning (processing block 404). Processing logic searches for signals generated by communication network transceivers enumerated in the prioritized listing, the search limited to the communication network transceivers enumerated in the prioritized listing and performed in a priority order specified by the listing (processing block 406). In one embodiment, the listing identifies to processing logic of the mobile device a limited number of transceivers to search for, and a specific order in which to perform the search, for purposes of acquiring signals for mobile based positioning. In one embodiment, processing logic limits the search for available network transceiver signals to signals generated by only those communication network transceivers delineated in the prioritized listing, and to the order defined in the listing, even when other communication network transceivers and/or signals may be available to the mobile device. That is, the listing defines the universe of specific transceivers for which processing logic should attempt to gather signal data, so that processing logic can avoid the computation, power, and time resources that would be consumed with a generalized search. In another embodiment, the communication network transceivers enumerated in the prioritized listing provide a first set of communication network transceivers to be searched, and other communication network transceivers that provide signals the mobile device may able to receive are searched according to another listing of neighboring communication network transceivers. In this embodiment, the prioritized listing may be searched by processing logic in conjunction with a search performed on the other listings and/or for communication network transceivers searched. For example, a larger number of mobile device system resources may be dedicated to search the prioritized listing than the resources allotted to search the other listings. Processing logic is thus able to quickly find available and high-quality signals from the limited number of communication network transceivers in the listing(s) for use in the positioning process. The increased efficiency and success rates in signal acquisition, when using the prioritized listing, ensures that less time, computation resources, and power resources are consumed by the mobile device when performing the positioning processes, as discussed herein.

Once a requisite number of signals have been found, the positioning process is performed based on data obtained from signals found in the search (processing block 408). In one embodiment, the positioning process is a mobile-based positioning process, a network based positioning process, a hybrid positioning process, as well as other positioning processes, that the mobile device may utilize to determine a real time location of the mobile device. In one embodiment, where the positioning process is a mobile-based positioning process, the mobile device computes its position. In another embodiment, where the positioning process is a network-based positioning process, a server computer system computes the mobile device's position. In the embodiments, the positioning process may be a positioning process that utilizes signals generated by transceivers in a service area, the known locations of the transceivers, and an analysis of the received signal data (e.g., observed time difference of arrival of the signals, or time of arrival of the signals, as well as other positioning techniques). The transceiver signals utilized may include one or more of positioning reference signals (PRS), cell-specific reference signals (CRS), as well as other reference signals generated by communication network transceiver with data, such as timing data, that enable the performance of the positioning operations. The performance of the positioning process may be triggered at the request of a user, at the detected failure of another positioning process (e.g., failure of a GNSS based positioning process for failure to acquire satellite signal(s)), etc.

Figure 5:
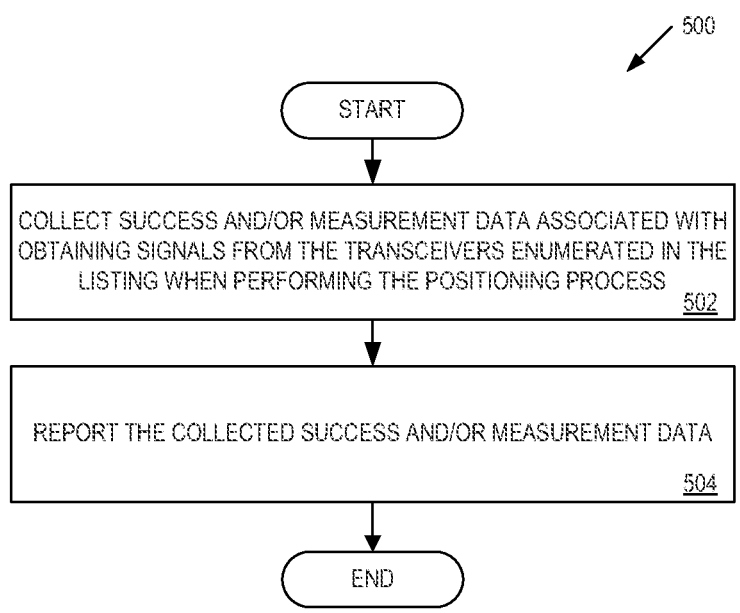
FIG. 5 is a flow diagram of one embodiment of a method for a mobile device reporting signal metrics associated with transceivers enumerated in a received prioritized listing.

FIG. 5 is a flow diagram of one embodiment of a method 500 for a mobile device reporting signal metrics associated with transceivers enumerated in a received prioritized listing. The method 500 is performed by processing logic that may comprise hardware (circuitry, dedicated logic, etc.), software (such as is run on a general purpose computer system or a dedicated machine), firmware, or a combination. In one embodiment, the method 500 is performed by a mobile device (e.g., mobile device 110 or 220).

Referring to FIG. 5, processing logic begins by collecting success and/or measurement data associated with obtaining signals from the transceivers enumerated in the listing when performing the positioning process (processing block 502). Processing logic then reports the collected success and/or measurement data (processing block 504). In one embodiment, processing logic may report signal metrics to a positioning assistance server indicative of whether it was able to obtain signals from the transceivers enumerated in the listing. Furthermore, if signals were obtained, measurement data indicative of the quality of the signals may also be reported, such as signal power, signal to noise, signal reliability, etc. Additionally, the mobile device's location, as determined from the positioning process performed at block 410 in FIG. 4, can be included in the report so that the signal data can be associated with the device's specific location in the service area for which the listing was generated. When the feedback of the mobile device is combined with the other signal measurement reporting sources, such as other mobile device, transceivers, etc. discussed above, a feedback loop is generated that enables the refinement of the prioritized listing for a service area to better reflect actual and evolving usage conditions within a service area of a communication network. That is, the prioritized listing can be continuously adapted to the evolving real world conditions of a service area of a communication network, or sub-region within the service area, to ensure a highly efficient positioning by the mobile device.

It should be appreciated that when the devices discussed herein include a mobile device, that the mobile may communicate via one or more wireless communication links through a wireless network that are based on or otherwise support any suitable wireless communication technology. For example, in some aspects mobile device and/or wearable device may associate with a network including a wireless network. In some aspects the wireless connections discussed herein form networks, which may comprise a body area network, a personal area network (e.g., an ultra-wideband network), as well as other types of networks. In some aspects the network may comprise a local area network or a wide area network. A wireless device may support or otherwise use one or more of a variety of wireless communication technologies, protocols, or standards such as, for example, CDMA, GSM, WCDMA, LTE, TD-SCDMA, TDMA, OFDM, OFDMA, WiMAX, and Wi-Fi. Similarly, a wireless device may support or otherwise use one or more of a variety of corresponding modulation or multiplexing schemes. A mobile wireless device may wirelessly communicate with other mobile devices, cell phones, wearable devices, other wired and wireless computers, Internet web-sites, etc.

The teachings herein may be incorporated into (e.g., implemented within or performed by) a variety of apparatuses (e.g., devices). For example, one or more aspects taught herein may be incorporated into a phone (e.g., a cellular phone), a personal data assistant (PDA), a tablet, a mobile computer, a laptop computer, a tablet, an entertainment device (e.g., a music or video device), a fitness device (e.g., a biometric sensor, a pedometer, etc.), a wearable device (e.g., a smartwatch), a smart system (e.g., a smart appliance, a smart automobile, a smart robot, or other smart device), or any other suitable device. These devices may have different power and data requirements and may result in different power profiles generated for each feature or set of features.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the embodiments described herein.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a non-transitory computer-readable medium. Computer-readable media can include both computer storage media and communication media including any medium that facilitates transfer of a computer program from one place to another. A storage media may be any available media that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of non-transitory computer-readable media.

The previous description is provided so that any person skilled in the art can make or use the embodiments described herein. Various modifications to these embodiments will be readily apparent to those skilled in the art, and the generic principles defined herein may be applied to other embodiments without departing from the spirit or scope of the described embodiments. Thus, the aspects and features described herein are not intended to be limited, but are to be accorded the widest scope consistent with the principles and novel features disclosed herein.

What is claimed is:

1. A method comprising:
   receiving signal measurements, reported by a plurality of different sources within a service area of a communication network, for signals generated by communication network transceivers that are detectable in the service area of the communication network;
   determining quality of the signals generated by the communication network transceivers for mobile device positioning based on an accumulation of the received signal measurements from the plurality of different sources over a period of time;
   generating a prioritized listing of communication network transceivers based on the determined quality of signals generated by the communication network transceivers, wherein different prioritized listings are generated for a plurality of different service areas within a communication network;
   receiving a request from a mobile device for the prioritized listing of communication network receivers, wherein the request comprises data indicative of the service area and data indicative of a position of the mobile device within the service area; and
   providing a second prioritized listing to the mobile device, wherein the second prioritized listing is a modified version of the prioritized listing for the service area, and wherein the modification is based on the position of the mobile device within the service area.

2. The method of claim 1, wherein the signal measurements comprise data indicative of at least one of signal strength, signal to noise ratio, signal reliability, signal power level, signal timing quality, signal synchronization quality, signal bandwidth, signal frequency, or any combination thereof.

3. The method of claim 1, wherein the generating the prioritized listing of communication network transceivers further comprises:
   selecting a communication network transceiver for inclusion in the prioritized listing of communication network transceivers in response to a determination that a quality of signals generated by the communication network transceiver exceeds a threshold; and
   ranking the communication network transceivers in the prioritized listing of communication network transceivers based on relative quality of signals to generate the prioritized listing.

4. The method of claim 1, wherein a number of communication network transceivers included in the prioritized listing of communication network transceivers includes less than all of the communication network transceivers that generate detectable signals within the service area of the communication network.

5. The method of claim 1, wherein the communication network comprises a cellular communication network.

6. The method of claim 1, wherein the communication network comprises a wireless local area network.

7. The method of claim 1, wherein the communication network comprises a combination of a cellular communication network and a wireless local area network, and wherein the prioritized listing of communication network transceivers comprises at least one cellular communication network transceiver and at least one wireless local area network transceiver.

8. The method of claim 1, wherein the plurality of different sources comprises a plurality of different devices within the service area of the communication network that collect signal data generated by the communication network transceivers, the plurality of different devices comprising at least one communication network transceiver and at least one mobile device.

9. The method of claim 2, wherein the quality of the signals is determined based on an analysis of the signal strength, the signal to noise ratio, the signal reliability, the signal power level, the signal timing quality, the signal synchronization quality, the signal bandwidth, the signal frequency, or any combination thereof.

10. The method of claim 3, wherein a number of communication network transceivers in the prioritized listing of communication network transceivers changes over time as new signal measurements are received based on the number of communication network transceivers that exceed a second threshold.

11. A system, comprising:
    a memory; and
    a processor coupled with the memory, wherein the processor configured to:
    receive signal measurements, reported by a plurality of different sources within a service area of a communication network, for signals generated by communication network transceivers in the service area of the communication network,
    determine quality of the signals generated by the communication network transceivers for mobile device positioning from an accumulation of the received signal measurements based on the plurality of different sources over a period of time,
    generate a prioritized listing of communication network transceivers in the service area based on the determined quality of signals generated by the communication network transceivers, wherein different prioritized listings are generated for a plurality of different service areas within a communication network,
    receive a request from a mobile device for the prioritized listing of communication network receivers, wherein the request comprises data indicative of the service area and data indicative of a position of the mobile device within the service area, and
    provide a second prioritized listing to the mobile device, wherein the second prioritized listing is a modified version of the prioritized listing for the service area, and wherein the modification is based on the position of the mobile device within the service area.

12. The system of claim 11, wherein the signal measurements comprise data indicative of at least one of signal strength, signal to noise ratio, signal reliability, signal power level, signal timing quality, signal synchronization quality, signal bandwidth, signal frequency, or any combination thereof.

13. The system of claim 11, wherein the processor to generate the prioritized listing of communication network transceivers further configured to:
    select a communication network transceiver for inclusion in the prioritized listing of communication network transceivers in response to a determination that a quality of signals generated by the communication network transceiver exceeds a threshold; and
    rank the communication network transceivers in the prioritized listing of communication network transceivers based on relative quality of signals to generate the prioritized listing.

14. The system of claim 11, wherein a number of communication network transceivers included in the prioritized listing of communication network transceivers includes less than all of the communication network transceivers that generate detectable signals within the service area of the communication network.

15. The system of claim 11, wherein the communication network comprises a cellular communication network.

16. The system of claim 11, wherein the communication network comprises a wireless local area network.

17. The system of claim 11, wherein the communication network comprises a combination of a cellular communication network and a wireless local area network, and wherein the prioritized listing of communication network transceivers comprises at least one cellular communication network transceiver and at least one wireless local area network transceiver.

18. The system of claim 11, wherein the plurality of different sources comprises a plurality of different devices within the service area of the communication network that collect signal data generated by the communication network transceivers, the plurality of different devices comprising at least one communication network transceiver and at least one mobile device.

19. The system of claim 12, wherein the quality of the signals is determined based on an analysis of the signal strength, the signal to noise ratio, the signal reliability, the signal power level, the signal timing quality, the signal synchronization, the signal bandwidth, the signal frequency, or any combination thereof.

20. The system of claim 13, wherein a number of communication network transceivers in the prioritized listing of communication network transceivers changes over time as new signal measurements are received based on the number communication network transceivers that exceed a second threshold.

21. A method comprising:
    requesting a prioritized listing of communication network transceivers for a service area of a communication network in which a mobile device is located, wherein the request comprises data indicative of the service area and data indicative of a position of the mobile device within the service area;
    receiving the prioritized listing of communication network transceivers, the prioritized listing comprising communication network transceivers, the prioritized listing based on a quality of signals generated by the communication network transceivers for mobile device positioning, wherein different prioritized listings are generated for a plurality of different service areas within a communication network, and wherein the received prioritized listing is a modified version of an original prioritized listing for the service area that has been modified based on the position of the mobile device within the service area;
    searching for signals generated by the communication network transceivers enumerated in the prioritized listing, the search limited to the communication network transceivers enumerated in the prioritized listing and performed in a priority order specified by the listing; and
    performing a positioning process based on data obtained from signals found in the search.

22. The method of claim 21, wherein the quality of the signals in the prioritized listing is based on a quality of periodically measured signal data from the communication network transceivers enumerated in the prioritized listing, and periodically measured signal data measured by a plurality of different measurement sources within the service area of the communication network for which the prioritized listing is associated.

23. The method of claim 21, wherein the signals found in the search, and used for performing the positioning process, comprise at least one of positioning reference signals or cell-specific reference signals generated by the communication network transceivers within the service area.

24. The method of claim 21, further comprising:
    storing the prioritized listing of communication network transceivers in a memory of the mobile device;
    initiating a second positioning process on the mobile device while the mobile device is in the service area of the communication network;
    searching for signals generated by the communication network transceivers based on the stored prioritized listing; and
    performing the second positioning process.

25. The method of claim 21, further comprising:
    initiating a second positioning process on the mobile device while the mobile device is in the service area of the communication network;
    requesting a new prioritized listing of communication network transceivers for the service area of the communication network, the new prioritized listing comprising an update to the prioritized listing made after the request for the prioritized listing; and
    searching for signals generated by the communication network transceivers based on the new prioritized listing.

26. A mobile device, comprising:
    a memory; and
    a processor coupled with the memory, wherein the processor configured to:
        request a prioritized listing of communication network transceivers for a service area of a communication network in which the mobile device is located, wherein the request comprises data indicative of the service area and data indicative of a position of the mobile device within the service area;
        receive the prioritized listing of communication network transceivers, the prioritized listing comprising communication network transceivers, the prioritized listing based on a quality of signals generated by the communication network transceivers for mobile device positioning, wherein different prioritized listings are generated for a plurality of different service areas within a communication network, and wherein the received prioritized listing is a modified version of an original prioritized listing for the service area that has been modified based on the position of the mobile device within the service area;

search for signals generated by the communication network transceivers enumerated in the prioritized listing, the search limited to the communication network transceivers enumerated in the prioritized listing and performed in a priority order specified by the listing; and perform a positioning process based on data obtained from signals found in the search.

27. The mobile device of claim 26, wherein the quality of the signals in the prioritized listing is based on a quality of periodically measured signal data from the communication network transceivers enumerated in the prioritized listing, and periodically measured signal data measured by a plurality of different measurement sources within the service area of the communication network for which the prioritized listing is associated.

28. The mobile device of claim 26, wherein the signals found in the search, and used for performing the positioning process, comprise at least one of positioning reference signals or cell-specific reference signals generated by the communication network transceivers within the service area.

29. The mobile device of claim 26, wherein the processor further configured to:

store the prioritized listing of communication network transceivers in the memory;

initiate a second positioning process while the mobile device is in the service area of the communication network, and search for signals generated by the communication network transceivers based on the stored prioritized listing; and performing the second positioning process.

30. The mobile device of claim 26, wherein the processor further configured to:

initiate a second positioning process on the mobile device while the mobile device is in the service area of the communication network;

request a new prioritized listing of the communication network transceivers for the service area of the communication network, the new prioritized listing comprising an update to the prioritized listing made after the request for the prioritized listing; and searching for signals generated by the communication network transceivers based on the new prioritized listing; and performing the second positioning process.

* * * * *